United States Patent
Eom et al.

(10) Patent No.: US 12,184,771 B2
(45) Date of Patent: Dec. 31, 2024

(54) ENCRYPTION KEY GENERATING METHOD, APPARATUS, CIPHERTEXT OPERATION METHOD AND APPARATUS USING THE GENERATED ENCRYPTION KEY

(71) Applicant: SAMSUNG ELECTRONICS CO., LTD., Suwon-si (KR)

(72) Inventors: Jieun Eom, Hwaseong-si (KR); Maksim Deriabin, Suwon-si (KR); Andrey Kim, Suwon-si (KR); Yongwoo Lee, Suwon-si (KR); Rakyong Choi, Suwon-si (KR); Whan Ghang, Suwon-si (KR); Dong-Hoon Yoo, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 17/744,258

(22) Filed: May 13, 2022

(65) Prior Publication Data

US 2022/0385461 A1   Dec. 1, 2022

(30) Foreign Application Priority Data

May 21, 2021   (KR) .................. 10-2021-0065439
Aug. 30, 2021  (KR) .................. 10-2021-0114638

(51) Int. Cl.
*H04L 9/00* (2022.01)
*H04L 9/06* (2006.01)
*H04L 9/08* (2006.01)

(52) U.S. Cl.
CPC ............ *H04L 9/0861* (2013.01); *H04L 9/008* (2013.01); *H04L 9/0618* (2013.01); *H04L 9/0891* (2013.01)

(58) Field of Classification Search
CPC ..... H04L 9/0861; H04L 9/008; H04L 9/0618; H04L 9/0891
See application file for complete search history.

(56) References Cited

U.S. PATENT DOCUMENTS 9,240,882 B2 *  1/2016  Tanizawa ................. H04L 9/08
9,432,342 B1 *  8/2016  Kothari ............... H04L 63/0435
10,673,615 B2   6/2020  Kipnis et al.
(Continued)

FOREIGN PATENT DOCUMENTS

CN    112543091 A     3/2021
KR    10-1600016 B1   3/2016

OTHER PUBLICATIONS

Sun, Xiaoqiang, et al. "Efficient identity-based leveled fully homomorphic encryption from RLWE." *Security and communication networks* 9.18, Nov. 18, 2016, pp. 5155-5165.
(Continued)

*Primary Examiner* — Darshan I Dhruv
(74) *Attorney, Agent, or Firm* — NSIP Law

(57) ABSTRACT

An encryption key generating method and apparatus based on homomorphic encryption, and a ciphertext operation method and apparatus using the generated encrypt key are disclosed. The method of generating an encryption key for performing encryption based on homomorphic encryption includes receiving data, generating a first encryption key and a second encryption key used for encrypting the data based on a secret key, and transmitting the first and second encryption keys.

19 Claims, 8 Drawing Sheets

(56) References Cited

U.S. PATENT DOCUMENTS

| | | | |
|---|---|---|---|
| 10,771,252 B1* | 9/2020 | Teng | H04L 9/0897 |
| 2015/0033033 A1* | 1/2015 | Halevi | H04L 9/008 |
| | | | 713/189 |
| 2018/0109376 A1 | 4/2018 | Gentry et al. | |
| 2018/0157840 A1* | 6/2018 | Crowley | G06F 21/575 |
| 2019/0260578 A1* | 8/2019 | Le Saint | H04L 9/0819 |
| 2019/0296896 A1* | 9/2019 | Resch | H04L 9/0656 |
| 2019/0340334 A1* | 11/2019 | Lindahl | H04L 9/0891 |
| 2019/0363871 A1* | 11/2019 | Cheon | H04L 9/304 |
| 2019/0386814 A1* | 12/2019 | Ahmed | H04L 9/008 |
| 2020/0252199 A1* | 8/2020 | Cheon | H04L 9/3093 |
| 2020/0313886 A1* | 10/2020 | Poeppelmann | H04L 9/3236 |
| 2021/0119766 A1 | 4/2021 | Suresh et al. | |

OTHER PUBLICATIONS

Kim, Jae-Heon, et al. "Fully Homomorphic Encryption Scheme without Key Switching." *The Journal of Korean Institute of Communications and Information Sciences* vol. 38C No. 5, May 31, 2013, pp. 428-433, (6 pages in Chinese).

Micciancio, Daniele, et al. "Bootstrapping in FHEW-like Cryptosystems." *Proceedings of the 9th on Workshop on Encrypted Computing & Applied Homomorphic Cryptography*, Feb. 10, 2021, pp. 1-26.

Chillotti, Ilaria, et al. "TFHE: Fast Fully Homomorphic Encryption over the Torus." *Journal of Cryptology* vol. 33.1, Apr. 25, 2019, pp. 1-62.

Ducas, Léo, et al. "FHEW: Bootstrapping Homomorphic Encryption in less than a second." *Annual International Conference on the Theory and Applications of Cryptographic Techniques*, Springer, Berling, Heidelberg, Aug. 11, 2020, pp. 1-27.

\* cited by examiner

ENCRYPTION KEY GENERATING METHOD, APPARATUS, CIPHERTEXT OPERATION METHOD AND APPARATUS USING THE GENERATED ENCRYPTION KEY

CROSS-REFERENCE TO RELATED APPLICATIONS

This application claims the benefit under 35 USC § 119(a) of Korean Patent Application No. 10-2021-0065439, filed on May 21, 2021, and Korean Patent Application No. 10-2021-0114638, filed on Aug. 30, 2021, in the Korean Intellectual Property Office, the entire disclosures of which are incorporated herein by reference for all purposes.

BACKGROUND

1. Field

The following description relates to an encryption key generating method and apparatus based on homomorphic encryption, and a ciphertext operation method and apparatus using the generated encrypt key.

2. Description of Related Art

Homomorphic encryption is a promising encryption method that enables arbitrary operations between encrypted data. Utilizing homomorphic encryption enables arbitrary operations on encrypted data without decrypting the encrypted data, and homomorphic encryption is lattice-based and thus, resistant to quantum algorithms and safer.

In a conventional encryption method, extracting only a constant term from a Ring Gentry Sahai Waters (RGSW) ciphertext is impossible and all input values required for a blind rotation operation need to be encrypted in different RGSW ciphertexts.

Since the RGSW ciphertext has a large size, a size of a public key increases when all required input values are encrypted for different RGSW ciphertexts. Thus, there is a demand for a technique to reduce a size of a public key.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of generating an encryption key for performing encryption based on homomorphic encryption, the method including receiving data, generating a first encryption key and a second encryption key used for encrypting the data based on a secret key, and transmitting the first and second encryption keys.

The generating of the first encryption key and the second encryption key may include determining an encryption constant based on the secret key, and generating the second encryption key based on the secret key and the encryption constant.

The first encryption key may include Ring-Gentry-Sahai-Waters (RGSW) ciphertext or ring learning with error (RLWE) ciphertext, and the second encryption key may include RLWE ciphertext.

The generating of the first encryption key and the second encryption key may include generating the first encryption key using Ring-Gentry-Sahai-Waters (RGSW) ciphertext based on the secret key or using ring learning with error' (RLWE') ciphertext based on a square of the secret key.

In another general aspect, there is provided a processor-implemented ciphertext operation method based on homomorphic encryption, the ciphertext operation method including receiving a first encryption key and a second encryption key generated based on data and a secret key, generating a blind rotation key used for a ciphertext operation of the data based on the first and second encryption keys, and performing a ciphertext operation of the data based on the blind rotation key.

The generating of the blind rotation key may include generating a portion of the blind rotation key by performing shift and zeroise operations on the second encryption key, and generating the blind rotation key based on a product of the first encryption key and the portion of the blind rotation key.

The generating of the portion of the blind rotation key by performing the shift and zeroise operations on the second encryption key may include generating ciphertext corresponding to the second encryption key, generating ciphertext having a sign of a portion of coefficients of a polynomial corresponding to the ciphertext being reversed by converting the sign, and generating the portion of the blind rotation key by adding or subtracting the ciphertext and the ciphertext with the sign reversed.

The generating of the ciphertext with the sign reversed may include converting the sign of a term, of which a remainder obtained by dividing an exponent of the coefficients of the polynomial by a degree of the polynomial is a predetermined number.

The generating of the portion of the blind rotation key by adding or subtracting the ciphertext and the ciphertext with the sign reversed may include obtaining a portion of coefficients of the polynomial by adding or subtracting the ciphertext and the ciphertext with the sign reversed, and generating the portion of the blind rotation key based on the portion of the coefficients.

In another general aspect, there is provided an encryption key generation apparatus for performing encryption based on homomorphic encryption, the encryption key generation apparatus including a receiver configured to receive data, and a processor configured to generate a first encryption key and a second encryption key used for encrypting the data based on a secret key, and to transmit the first and second encryption keys.

The processor may be configured to determine an encryption constant based on the secret key, and generate the second encryption key based on the secret key and the encryption constant.

The first encryption key may include Ring-Gentry-Sahai-Waters (RGSW) ciphertext or ring learning with error (RLWE) ciphertext, and the second encryption key may include RLWE ciphertext.

The processor may be configured to generate the first encryption key using Ring-Gentry-Sahai-Waters (RGSW) ciphertext based on the secret key or using ring learning with error' (RLWE') ciphertext based on a square of the secret key.

In another general aspect, there is provided a ciphertext operation apparatus based on homomorphic encryption, the ciphertext operation apparatus including a receiver configured to receive a first encryption key and a second encryption key generated based on data and a secret key, and a processor configured to generate a blind rotation key used for a ciphertext operation of the data based on the first and second encryption keys, and to perform the ciphertext operation of the data based on the blind rotation key.

The processor may be configured to generate a portion of the blind rotation key by performing shift and zeroise operations on the second encryption key, and generate the blind rotation key based on a product of the first encryption key and the portion of the blind rotation key.

The processor may be configured to generate ciphertext corresponding to the second encryption key, generate ciphertext having a sign of coefficients of a polynomial corresponding to the ciphertext being reversed by converting the sign, and generate the portion of the blind rotation key by adding or subtracting the ciphertext and the ciphertext with the sign reversed.

The processor may be configured to generate the ciphertext with the sign reversed by converting the sign of a term, of which a remainder obtained by dividing an exponent of the coefficients of the polynomial by a degree of the polynomial is a predetermined number.

The processor may be configured to obtain a portion of coefficients of the polynomial by adding or subtracting the ciphertext and the ciphertext with the sign reversed, and generate the portion of the blind rotation key based on the portion of the coefficients.

In another general aspect, there is provided a ciphertext operation apparatus based on homomorphic encryption, the ciphertext operation apparatus including a receiver configured to receive a first encryption key and a second encryption key generated based on data and a secret key, and a processor configured to generate a portion of a blind rotation key used for a ciphertext operation of the data based on the first and second encryption keys, and to perform the ciphertext operation of the data based on the portion of the blind rotation key.

Other features and aspects will be apparent from the following detailed description, the drawings, and the claims.

Figure 1A:
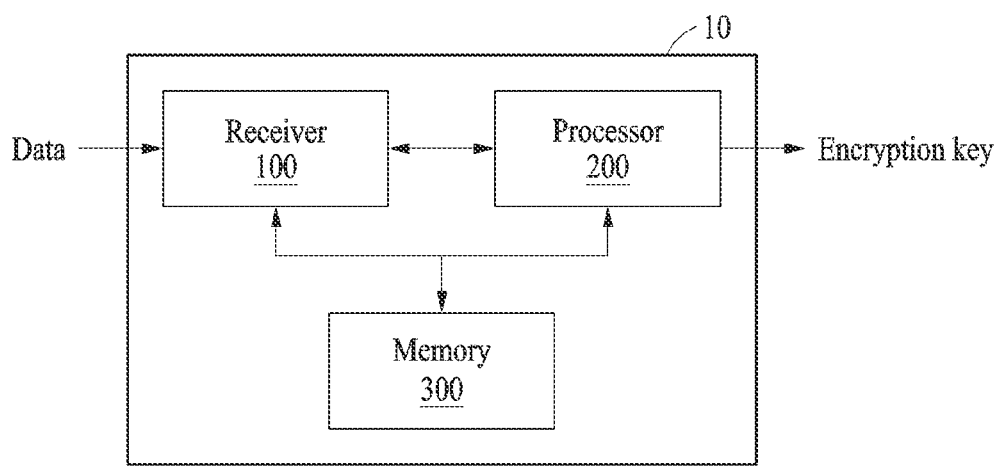
FIG. 1A illustrates an example of an encryption key generation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular example embodiments only and is not to be limiting of the example embodiments. The singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising," 'have/having,", and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements. In contrast, when an element is described as being "directly connected to," or "directly coupled to" another element, there can be no other elements intervening therebetween.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 1B:
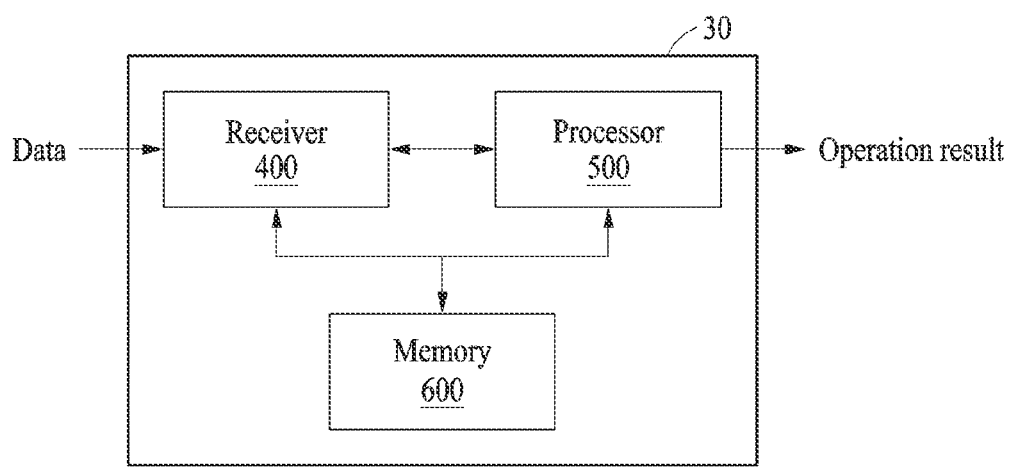
FIG. 1B illustrates an example of a ciphertext operation apparatus.

FIG. 1A illustrates an example of an encryption key generation apparatus. FIG. 1B illustrates an example of a ciphertext operation apparatus.

Referring to FIGS. 1A and 1B, an encryption key generation apparatus 10 may generate an encryption key based on data. The encryption key generation apparatus 10 may generate an encryption key to perform data encryption or a ciphertext operation. A ciphertext operation apparatus 30 may perform data encryption or a ciphertext operation based on the generated encryption key. Hereinafter, encrypted data or encrypted text may be referred to as ciphertext. The ciphertext may be in the form of a polynomial or a vector including a polynomial.

An encryption key of the encryption key generation apparatus 10 may be applicable to all ring learning with error (RLWE) problem-based homomorphic encryptions. The encryption key generation apparatus 10 may perform an encryption process to encrypt an input value in all devices and services to which homomorphic encryption is applied. The encryption key generation apparatus 10 may generate a public key (for example, a blind rotation key) required for implementation of a blind rotation operation in homomorphic encryption. The blind rotation operation may include a look up table (LUT) operation. The blind rotation key may include an LUT key. The encryption key generation apparatus 10 may perform an operation using ciphertext in all devices to which homomorphic encryption is applied.

The ciphertext operation apparatus 30 may provide an encryption technique for performing an operation on encrypted data, which is encrypted using homomorphic encryption, without decryption. For example, the ciphertext operation apparatus 30 may derive the same result as an operation result of data in a plaintext state by decrypting an operation result of encrypted data, which is encrypted using homomorphic encryption. The ciphertext operation apparatus 30 may provide a homomorphic encryption operation for an arbitrary binary number, integer, real number, or complex number.

The ciphertext operation apparatus 30 may perform modulus refresh or bootstrapping that is for homomorphic encryption. In case an operation is performed using ciphertext generated using homomorphic encryption, a modulus value corresponding to the ciphertext may be reduced or an error value may increase. The modulus refresh or bootstrapping may refer to an operation of changing a reduced modulus to a larger modulus or changing an increased error to a small value of error to perform more ciphertext operations.

The ciphertext operation apparatus 30 may perform an encryption process of encrypting an input value in an arbitrary device and service using homomorphic encryption. The ciphertext operation apparatus 30 may perform a ciphertext operation using homomorphic encryption that computes ciphertext configured in plaintext including a binary number, an integer, a real number, or a complex number.

The ciphertext operation apparatus 30 may perform a homomorphic encryption to an operation of ciphertext, and may replace an operation of performing a blind rotation operation and key (for example, an encryption key) generation. The ciphertext operation apparatus 30 may perform an operation of encrypting an input value, generating a key, and performing an LUT operation in privacy preserving computing (PPC) and application services. The encryption key generation apparatus 10 may provide a service for a client that has a limit in operation quantity or communication by reducing a size of an encryption key.

In an example, the encryption key generation apparatus 10 may be implemented in a client device. In another example, the ciphertext operation apparatus 30 may be implemented in a server.

The encryption key generation apparatus 10 and the ciphertext operation apparatus 30 may be implemented in a form of a chip and may be mounted on a hardware accelerator that utilizes homomorphic encryption. For example, the encryption key generation apparatus 10 and the ciphertext operation apparatus 30 may be implemented in a portable device, personal computer (PC), a data server, or a mobile device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be implemented as a smart watch, a smart band, or a smart ring.

The encryption key generation apparatus 10 may include a receiver 100 and a processor 200. The encryption key generation apparatus 10 may further include a memory 300. The ciphertext operation apparatus 30 may include a receiver 400 and a processor 500. The ciphertext operation apparatus 30 may further include a memory 600.

The receiver 100 and the receiver 400 may include a receiving interface. The receiver 100 and the receiver 400 may receive data. The receiver 100 may receive plaintext or ciphertext. The receiver 400 may receive first and second encryption keys generated based on a secret key. The ciphertext may have a modulus corresponding to the ciphertext. The receiver 100 and the receiver 400 may output received data, plaintext, ciphertext, encryption key, or blind rotation key to the processor 200 or the processor 500.

The processor 200 and the processor 500 may process data stored in the memory 300 and the memory 600. The processor 200 and the processor 500 may execute computer-readable code (for example, software) stored in the memory 300 and the memory 600 and instructions triggered by the processor 200 and the processor 500.

The processor 200 and the processor 500 may be data processing devices implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 200 may generate a secret key or a first encryption key and a second encryption key based on the secret key corresponding to a parameter. The first encryption key may include Ring Gentry Sahai Waters (RGSW) ciphertext or ring learning with error' (RLWE') ciphertext. The second encryption key may include RLWE ciphertext. The processor 200 may transmit the first and second encryption keys. For example, the processor 200 may transmit the first and second encryption key to a server.

The processor 200 may generate the first encryption key using RGSW ciphertext based on a secret key or using RLWE' ciphertext based on a square of a secret key.

The processor 200 may determine an encryption constant based on a secret key. The processor 200 may generate the second encryption key based on the secret key and the encryption constant.

Based on the first and second encryption keys, the processor 500 may generate a blind rotation key used for a ciphertext operation of data. Based on the first and second encryption keys, the processor 500 may generate a blind rotation key for a homomorphic operation such as ciphertext modulus refresh or bootstrapping.

The processor 500 may generate a portion of the blind rotation key by performing a shift operation and a zeroise operation on the second encryption key.

The processor 500 may generate ciphertext corresponding to the second encryption key. The processor 500 may generate ciphertext of which a sign of a portion of coefficients among coefficients of a polynomial corresponding to the ciphertext is reversed by converting the sign.

The processor 500 may generate a portion of the blind rotation key by adding or subtracting the ciphertext and the ciphertext of which the sign is reversed. The processor 200 may generate a blind rotation key based on a product of the first encryption key and the portion of the blind rotation key.

The processor 500 may perform a ciphertext operation of data based on the blind rotation key.

The processor 500 may perform a homomorphic operation, modulus refresh, or bootstrapping of ciphertext corresponding to received data by performing a blind rotation operation based on the blind rotation key.

The processor 500 may perform a ciphertext operation on-the-fly using the portion of the blind rotation key. The processor 500 may generate the portion of the blind rotation key used for the ciphertext operation of the data based on the first and second encryption keys, and may perform the ciphertext operation of the data based on the generated portion of the blind rotation key.

The memory 300 stores instructions (or programs) executable by the processor 200. For example, the instructions include instructions to perform an operation of the processor 200 and/or an operation of each element of the processor 200.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
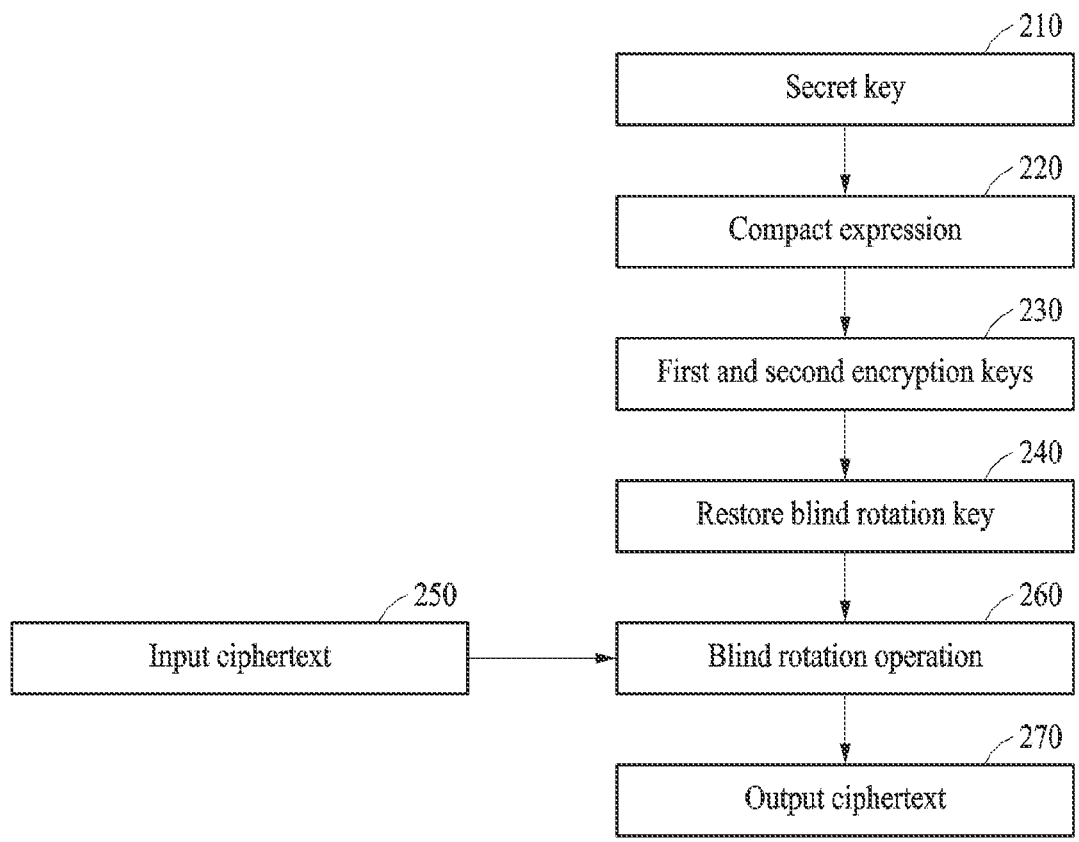
FIG. 2 illustrates an example of an operation of generating an encryption key and encrypting.

FIG. 2 illustrates an example of an operation of generating an encryption key and encrypting. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIGS. 1A-1B are also applicable to FIG. 2, and are incorporated herein by reference. Thus, the above description may not be repeated here.

Referring to FIG. 2, a processor (for example, the processor 200 of FIG. 1A) and a processor (for example, the processor 500 of FIG. 1B) may utilize RLWE ciphertext or RLWE' ciphertext instead of RGSW ciphertext in an LUT operation for homomorphic encryption. The processor 200 may generate RLWE' ciphertext and RGSW ciphertext encrypting only a value that is needed from RLWE' ciphertext.

The processor 200 may separate ciphertext for s, which is a common portion, from an encryption key RGSW={(RLWE'($s_i$*·s), RLWE'($s_i$*))} and encrypt the ciphertext, and may separately generate a key for RLWE'($s_i$*). The processor 200 may perform a blind rotation operation having the same result as conventional encryption method using a small-sized public key compared to a conventional encryption method by reducing a number of encryption keys by packings $s_i$* s to a small number of polynomials. The processor 500 may perform a blind rotation operation that derives the same result as the previous result using the generated small-sized public key.

Unlike RGSW ciphertext, in case of using RLWE ciphertext or RLWE' ciphertext, the processor 200 may easily generate new ciphertext that stores only a portion of plaintext, which is stored by existing ciphertext, using an automorphic mapping feature. The processor 200 may generate a public key by encrypting various input values into one ciphertext. By reducing a size of a public key, the processor 200 may reduce an operation load of a client and may significantly reduce communication traffic of the entire encryption system. Specifically, the processor 200 may reduce a size of an encryption key, needed by a homomorphic encryption method using a blind rotation operation, by thousands of times.

In an example shown in FIG. 2, the processor 200 may perform operations 210 to 230. The processor 500 may perform operations 240 to 270. In operation 210, the processor 200 may receive a secret key. The secret key may include a coefficient that has a form of {−1, 0, 1}.

In operation 220, the processor may perform a compact expression process. The compact expression process may refer to a process of packing encryption constants, derived from the secret key, to one RLWE' ciphertext and a process of storing RGSW ciphertext in a relatively less number of RLWE' ciphertexts. The RLWE' ciphertext may be configured in a plurality of RLWE ciphertexts. The details of RGSW ciphertext, RLWE' ciphertext, and RLWE ciphertext are described with reference to FIG. 3.

In operation 230, the processor 200 may generate the first encryption key and the second encryption key. The processor 200 may generate a small-sized encryption key (for example, the first and second encryption keys) by compact expression.

The secret key may have a form of polynomial. For example, the processor 200 may receive a secret key $s = s_0 + s_1 X + \ldots + s_{N-1} X^{N-1}$ having a polynomial form. The processor 200 may generate the first encryption key slk=RGSW(s) and the second encryption key slk*=RLWE'(s*) based on the received secret key. The processor 200 may generate slk'=RGSW($s^2$) or slk'=RLWE'($s^2$) with the first encryption key based on the secret key. The processor 200 may generate the second encryption key slk*=RLWE'(s*) by RLWE' encrypting slk*=$s_0$*+$s_1$*X+ ... +$s_{N-1}$*$X^{N-1}$, which is a polynomial configured in encryption constants. Each coefficient may be an encryption constant set based on a secret key coefficient.

The processor 500 may generate a blind rotation key by obtaining RLWE' ciphertext that only stores desired data $s_{i^*}$ from RLWE' by performing shift and zeroise operations.

In operation 240, the processor 500 may restore the blind rotation key. The processor 500 may restore a complete blind rotation key using automorphic mapping of the RLWE ciphertext from a compact blind rotation key. The processor 500 may restore the blind rotation key by restoring new RGSW ciphertext RGSW(s) for $s_i$* using RGSW(s) and RLWE' ciphertext after the shift and zeroise operations.

The processor 500 may generate (RLWE'($s_0$*), RLWE'($s_1$*), ..., RLWE'($s_{N-1}$*)), which is a portion of the blind rotation key, based on the second encryption key.

The processor 500 may calculate N ciphertext by shifting each coefficient of RLWE'(s*) into a constant term as shown below.

$$s_0'' = s_0^* + s_1^* X + \ldots + s_{N-1}^* X^{N-1} \quad : RLWE'(s_0'')$$
$$s_1'' = s_1^* + s_2^* X + \ldots + s_0^* X^{N-1} \quad : RLWE'(s_1'')$$
$$\vdots$$
$$s_{N-1}'' = s_{N-1}^* + s_0^* X + \ldots + s_{N-2}^* X^{N-1} \quad : RLWE'(s_{N-1}'')$$

A process of calculating N ciphertext may be performed in an encrypted state.

The processor 500 may perform a zeroise operation that shifts coefficients into "0", except for a constant term. The processor 500 may shift all coefficients, which are not a constant term, into "0" through a process of coefficient sign conversion and addition for RLWE'($s_0''$), RLWE'($s_1''$), ..., RLWE'($s_{N-1}''$) respectively. Through this process, the processor 500 may calculate ciphertext as shown below.

$$s_0^* = s_0^* + 0 \cdot X + \ldots + 0 \cdot X^{N-1} \quad : RLWE'(s_0^*)$$
$$s_1^* = s_1^* + 0 \cdot X + \ldots + 0 \cdot X^{N-1} \quad : RLWE'(s_1^*)$$
$$\vdots$$
$$s_{N-1}^* = s_{N-1}^* + 0 \cdot X + \ldots + 0 \cdot X^{N-1} \quad : RLWE'(s_{N-1}^*)$$

The processor 500 may generate a blind rotation key RGSW($s_i$*)=(RLWE'($s_i$*·s), RLWE'($s_i$*)) for all i∈[0,N−1] based on the first encryption key and the portion of the blind rotation key.

Since RLWE'($s_i$*) is restored as the portion of the blind rotation key, the processor 500 may obtain RLWE'($s_i$*·s) using the blind rotation key.

The portion of the blind rotation key may have a form shown in Equation 1.

$$RLWE'(s_i^*) = \begin{pmatrix} RLWE(g_0 \cdot s_i^*) \\ RLWE(g_1 \cdot s_i^*) \\ \ldots \\ RLWE(g_{d-1} \cdot s_i^*) \end{pmatrix} = \begin{pmatrix} (b_0, a_0) \\ (b_1, a_1) \\ \vdots \\ (b_{d-1}, a_{d-1}) \end{pmatrix} \quad \text{[Equation 1]}$$

In an example, g and d may denote a predefined vector for decomposition of an arbitrary integer.

As shown in Equation 2, the processor 500 may generate (or, restore) a blind rotation key using RGSW(s)= (RLWE'(s),RLWE'($s^2$)) and the portion of the blind rotation key, RLWE'($s_i$*).

$$lk_i = \begin{pmatrix} (b_0, a_0) \odot RGSW(s) \\ (b_1, a_1) \odot RGSW(s) \\ \vdots \\ (b_{d-1}, a_{d-1}) \odot RGSW(s) \end{pmatrix} = \quad \text{[Equation 2]}$$

$$\begin{pmatrix} b_0 \cdot RLWE'(s) + a_0 \cdot RLWE'(s^2) \\ b_1 \cdot RLWE'(s) + a_1 \cdot RLWE'(s^2) \\ \vdots \\ b_{d-1} \cdot RLWE'(s) + a_{d-1} \cdot RLWE'(s^2) \end{pmatrix} =$$

$$\begin{pmatrix} RLWE(g_0 \cdot s_i^* \cdot s) \\ RLWE(g_1 \cdot s_i^* \cdot s) \\ \vdots \\ RLWE(g_{d-1} \cdot s_i^* \cdot s) \end{pmatrix} = RLWE'(s_i^* \cdot s)$$

A final blind rotation key may be RGSW($s_i$*)=($lk_i$,RLWE'($s_i$*)) for all i∈[0,N−1].

The processor 500 may generate a blind rotation key RGSW($s_i$*)=(RLWE'($s_i$*·s), RLWE'($s_i$*)) for all i∈[0,N−1] based on a portion of the blind rotation key and the first encryption key RLWE'.

In case the first encryption key is RLWE'($s^2$), not RGSW(s)=(RLWE'(s),RLWE'($s^2$)), the processor 500 may generate the blind rotation key using RLWE'($s_i$*), which is a portion of the blind rotation key, as shown in Equation 3.

$$lk_i = \begin{pmatrix} b_0 \cdot (1, 0) + a_0 \cdot RLWE'(s^2) \\ b_1 \cdot (1, 0) + a_1 \cdot RLWE'(s^2) \\ \vdots \\ b_{d-1} \cdot (1, 0) + a_{d-1} \cdot RLWE'(s^2) \end{pmatrix} = \quad \text{[Equation 3]}$$

$$\begin{pmatrix} RLWE(g_0 \cdot s_i^* \cdot s) \\ RLWE(g_1 \cdot s_i^* \cdot s) \\ \vdots \\ RLWE(g_{d-1} \cdot s_i^* \cdot s) \end{pmatrix} = RLWE'(s_i^* \cdot s)$$

Finally, a blind rotation key may be RGSW($s_i$*)=($lk_i$, RLWE'($s_i$*)) for all i∈[0,N−1].

In operation 260, the processor 500 may receive a ciphertext input and may perform a blind rotation operation based on a restored blind rotation key for the received ciphertext. The blind rotation operation may be homomorphically performed. The processor 500 may perform the blind rotation operation using the restored RGSW($s_i$*). In operation 270, the processor 500 may output ciphertext on which the blind rotation operation is performed.

Figure 3:
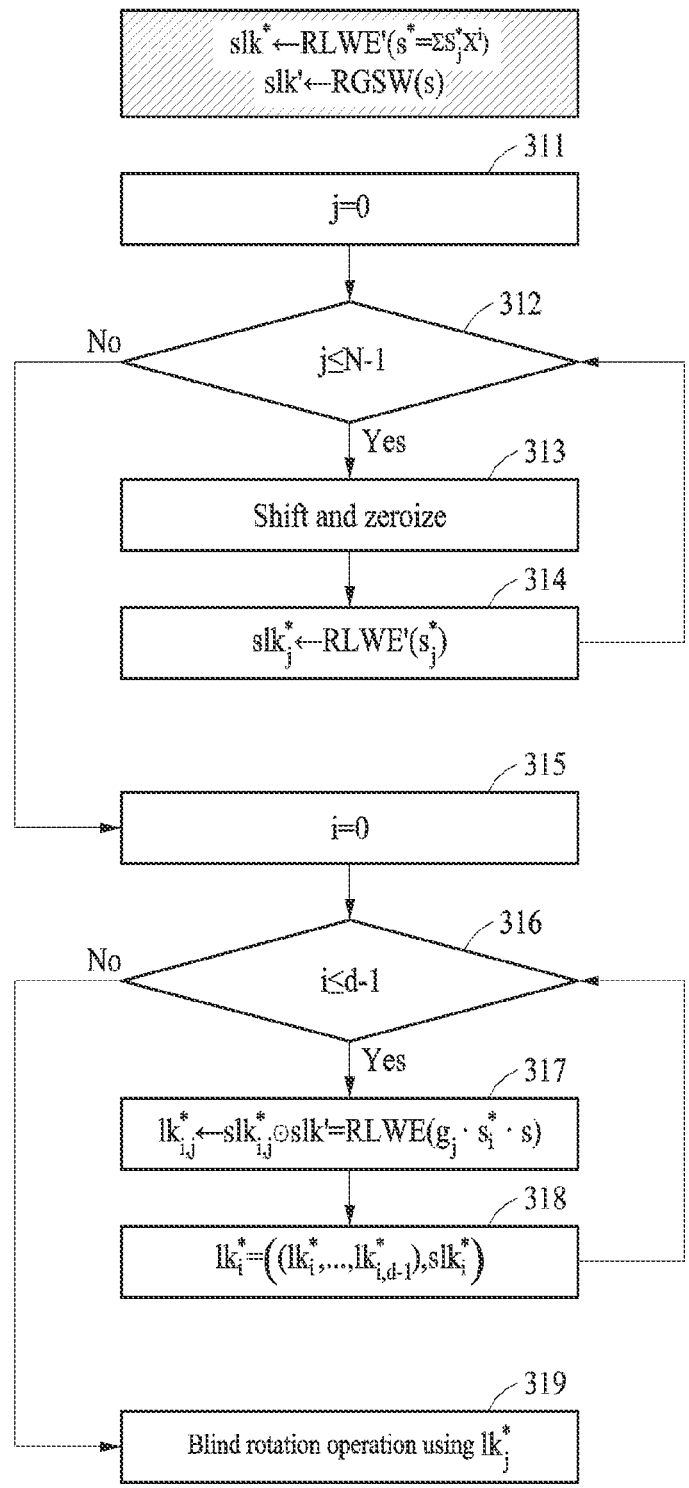
FIG. 3 illustrates an example of an operation of generating an encryption key by the encryption key generation apparatus of FIG. 1A.

FIG. 3 illustrates an example of an operation of generating an encryption key by the encryption key generation apparatus of FIG. 1A. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1A-2 are also applicable to FIG. 3, and are incorporated herein by reference. Thus, the above description may not be repeated here.

Referring to FIG. 3, a processor (for example, the processor 200 of FIG. 1B) may generate a blind rotation key. The processor 500 may generate a blind rotation key for ciphertext that satisfies a·s+b=m+e(mod q) for ciphertext (a,b) and a secret key s having a coefficient {−1, 0, 1}. The processor 500 may perform a blind rotation operation by restoring a blind rotation key.

The processor 200 may determine an encryption constant. The processor 200 may determine the encryption constant as $s_i^+=1$ if s[i]=1, $s_i^+=0$, otherwise for an i-th coefficient s[i] of a secret key s. Hereinafter, the encryption constant may be represented as $s_i^*$, and * may include + or −.

The processor 200 may encrypt N $s_i^*$ to one ciphertext, slk*. N may denote a degree of a polynomial configuring ciphertext corresponding to received data. The processor 200 may provide tradeoff between traffic quantity and operation quantity by encrypting $s_i^*$ to one or more ciphertexts.

The processor 200 may generate a first encryption key and a second encryption key based on the ciphertext and the secret key. The processor 200 may generate the second encryption key by performing the compact expression process of the secret key.

The processor 200 may generate the first encryption key. the first encryption key may be slk', which is RGSW ciphertext for s. The processor 200 may generate the second encryption key. The second encryption key may be slk*, which is ciphertext for $s_i^*$. slk* may be designed to calculate only RLWE' that encrypts a coefficient using automorphic mapping when performing a blind rotation operation by the processor 500.

The processor 200 may generate RGSW ciphertext using the RLWE ciphertext. The RLWE ciphertext of a message m for the secret key s may be defined as RLWE(m)=(a,a·s+e+m). Here, a may be a polynomial with a coefficient on the modulus q, and e may be an error polynomial with a small coefficient. The processor 200 may randomly generate a and e at every encryption.

The processor 200 may define RLWE' ciphertext of the message m for s as RLWE'=(RLWE($g_0$·m), RLWE($g_1$·m), ..., RLWE($g_{d-1}$·m)). Here, ($g_0, g_1, ..., g_{d-1}$) may be a vector defined in advance for decomposing an arbitrary integer, and may have the form of $(1, B, B^2, ..., B^{d-1})$ for an arbitrary integer B or may be set to $(\overline{Q}_0 \cdot [\overline{Q}_0^{-1}]_{q_0}, ..., \overline{Q}_{d-1} \cdot [\overline{Q}_{d-1}^{-1}]_{q_{d-1}})$ for $\overline{Q}_i = Q/q_i$. Finally, the processor 200 may define the RGSW ciphertext of the message s for the secret key m as RGSW(m)=(RLWE'(−sm), RLWE'(m)).

The processor 200 may encrypt ciphertext for s, which is a common portion in RGSW={(RLWE'($s_i^*$·s),RLWE'($s_i^*$))} by separating the ciphertext, and may separately generate an encryption key (for example, the second encryption key) for RLWE'($s_i^*$).

A blind rotation key used for a blind rotation operation by the processor (for example, the processor 500 of FIG. 1B) may be ciphertext for $s_i^*$. The processor 200 may contain ciphertext for $s_i^*$ into one ciphertext. $s_i^*$ may have a form of $s^*=\Sigma s_i^* X^i$.

In operation 311, the processor 500 may set a loop index j to be "0". The processor 500 may iteratively perform operations 312 to 314 while j≤N−1 being satisfied. In operation 312, the processor 500 may determine whether j≤N−1 is satisfied. N may represent a degree of a polynomial of the ciphertext.

While a condition for operation 312 is satisfied, in operation 313, the processor 500 may perform shift and zeroise operations. In operation 314, the processor 200 may perform $slk_j^* \leftarrow RLWE'(s_j^*)$ while increasing an index j by 1.

The processor 500 may generate a portion of a blind rotation key by performing shift and zeroise operations to the second encryption key. When RLWE($a_0+a_1X+a_2X^2 ... +a_{N-1}X^{X-1}$), which is the second encryption key in RLWE ciphertext form, is given, the processor 500 may generate ciphertext where a sign of an odd-numbered term is reversed as RLWE($a_0-a_1X+a_2X^2 ... -a_{N-1}X^{N-1}$), using automorphic mapping of the RLWE ciphertext. The processor 200 may obtain RLWE($2a_0+2a_2X^2 ... +2a_{N-2}X^{N-2}$) by adding RLWE($a_0+a_1X+a_2X^2 ... +a_{N-1}X^{N-1}$) and RLWE($a_0-a_1X+a_{2x}^2 ... -a_{N-1}X^{N-1}$).

Similarly, the processor 500 may generate ciphertext of which a sign of a term of an index, a remainder thereof divided by 4 as RLWE($2a_0-2a_2X^2+2a_4X^4 ... -2a_{N-2}X^{N-2}$) using automorphic mapping is 2, is reversed. The processor 500 may obtain RLWE($4a_0+4a_4X^4 ... +4a_{N-4}X^{N-4}$) by calculating a sum of RLWE($2a_0+2a_2X^2 ... +2a_{N-2}X^{N-2}$) and RLWE($2a_0-2a_2X^2+2a_4X^4 ... -2a_{N-2}X^{N-2}$).

By repeating the above-described processes, the processor 500 may obtain RLWE($Na_0$), and may obtain RLWE($a_0$) by dividing RLWE($Na_0$) by N.

The processor 500 may obtain RLWE($a_0+a_1X+a_2X^2 ... +a_{N-1}X^{N-1}$) and may obtain RLWE($a_i+a_{i+1}X+a_{i+2}X^2 ... -a_{i-1}X^{N-1}$) by multiplying RLWE($a_0+a_1X+a_2X^2 ... +a_{N-1}X^{N-1}$) with $X^{-i}$. The processor 500 may obtain RLWE($a_i$) based on RLWE($a_i+a_{i+1}X+a_{i+2}X^2 ... -a_{i-1}X^{N-1}$).

The RLWE' ciphertext may be a tuple of the RLWE ciphertext. The processor 200 may generate the portion of the blind rotation key by obtaining $slk_j^* \leftarrow RLWE'(s_j^*)$ from $slk^* \leftarrow RLWE'(s^*=\Sigma s_i^* X^i)$ using the above-described calculation method.

The processor 500 may generate a blind rotation key based on a product of the first encryption key and the second encryption key. The processor 500 may obtain the blind rotation key by iteratively calculating $lk_i^*$. In operation 315, in case a condition of operation 312 is not satisfied, the processor 500 may set a loop index i to be "0".

The processor 500 may iteratively perform operations 316 to 318 while i≤d−1 is satisfied. In operation 316, the processor 500 may determine whether i≤d−1 is satisfied. The processor 500 may generate a blind rotation key based on a product of the first encryption key and the second encryption key. Here, d may represent a dimension of a vector used to represent the RLWE ciphertext.

$slk_{i,j}^*$ may be represented as $slk_j^* = (slk_{i,0}^*, slk_{i,1}^*, ..., slk_{i,d-1}^*)$, and $slk_{i,j}^*$ may be RLWE ciphertext. A product of RLWE ciphertext and RWGS ciphertext may return RLWE ciphertext that has a small error. In operation 317, the processor 500 may calculate $lk_{i,j}^* \leftarrow slk_{i,j}^* \odot slk' = RLWE(g_j s_j^* \cdot s)$ using a characteristic that returns RLWE ciphertext having a small error. Here, ($g_0, g_1, ..., g_{d-1}$) may represent a vector that is defined for decomposition of an arbitrary integer. ($g_0, g_1, ..., g_{d-1}$) may have a form of $(\overline{Q}_0 \cdot [\overline{Q}_0^{-1}]_{q_0}, ..., \overline{Q}_{d-1} \cdot [\overline{Q}_{d-1}^{-1}]_{q_{d-1}})$ for $(1, B, B^2, ..., B^{d-1})$ or $\overline{Q}_i = Q/q_i$.

In operation 318, the processor 500 may generate a blind rotation key by calculating $lk_i^*$. ($lk_{i,0}^*, ..., lk_{i, d-1}^*$) may be RLWE($s_i^* \cdot s$). The processor 500 may calculate $lk_i^* = ((lk_{i,0}^*, \ldots, lk_{i,d-1}^*), slk_i^*)$ using RLWE($s_i^* \cdot s$).

In operation 319, the processor 500 may perform a blind rotation operation on the ciphertext using $lk_i^*$.

The processor 20 may generate encryption constants $s_j^+$ and $s_j^-$ for the coefficients s of the secret key $s_j \in \{-1,0,1\}$ based on conditions described below. In case $s_j=1$, the processor 200 may generate the encryption constants as $s_j^+=1$ and $s_j^-=0$. In case $s_j=0$, the processor 200 may generate the encryption constants as $s_j^+=0$ and $s_j^-=0$. In case $s_j=-1$, the processor 200 may generate the encryption constants as $s_j^+=0$ and $s_j^-=1$.

The processor 500 may generate a blind rotation key based on the encryption constants, and may perform a blind rotation operation based on the blind rotation key. For example, the processor 500 may generate RGSW ciphertext for a polynomial having $s_j^+$ and $s_j^-$ as constant terms, and may use the RGSW ciphertext as the blind rotation key. The blind rotation key including the RGSW ciphertext may be represented as $\{RGSW(s_j^+), RGSW(s_j^-)\}_{j=[0, N-1]}$.

The processor 500 may perform the blind rotation operation on each coefficient $u_i$ using $(\vec{a}_i, b_i)$. The processor 500 may define an arbitrary function g as $f(X)=\Sigma_{k=0}^{N-1}g(k) \cdot X^k$, and may perform initialization to $ACC_0 \leftarrow f(X) \cdot X^{b_i}$. The processor 500 may obtain ciphertext $ACC_N=(a_i', b_i') \in R_Q^2$ for $m_i+g(u_i)+d_1 \cdot X+ \ldots +d_{N-1} \cdot X^{N-1}$ by iteratively performing $ACC_{j+1} \leftarrow ACC_j \cdot (1+(X^{a_j}-1) \cdot RGSW(s_j^+)+(X^{-a_j}-1) \cdot RGSW(s_j^-))$ for all $j \in \{0, \ldots, N-1\}$.

Figure 4:
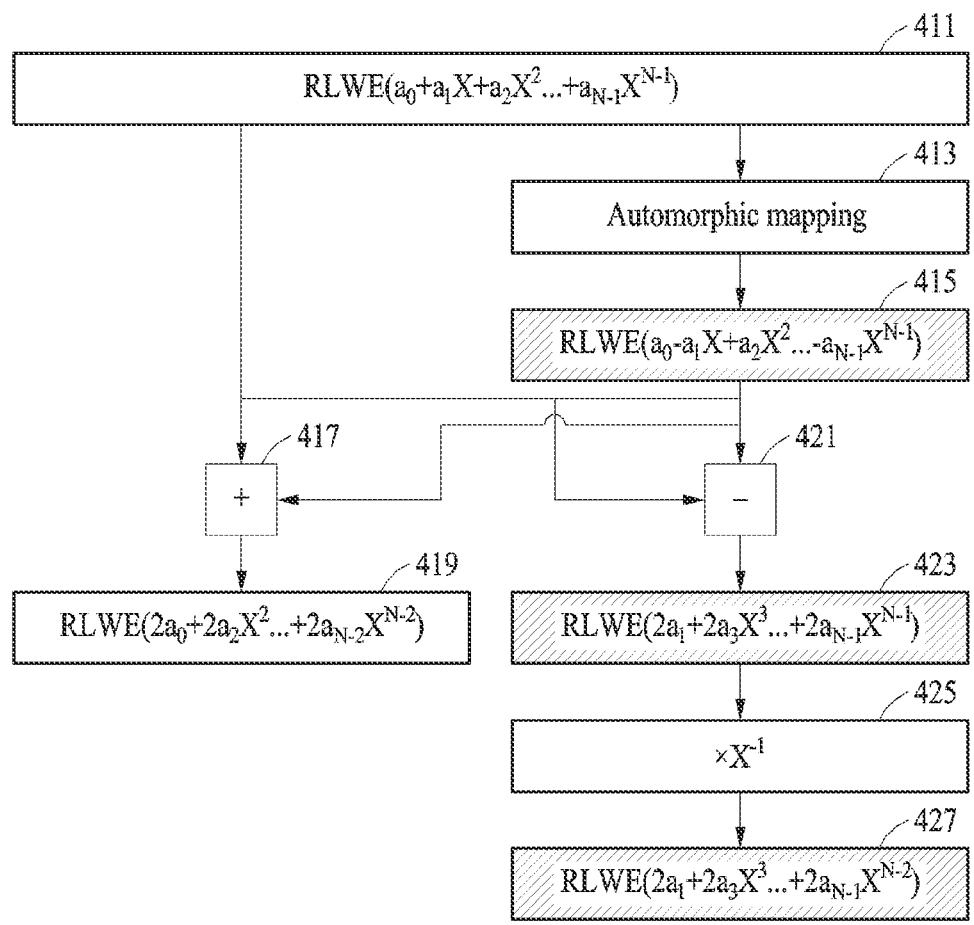
FIG. 4 illustrates an example of reducing an operation quantity of shift and zeroise operations.

FIG. 4 illustrates an example of reducing an operation quantity of shift and zeroise operations. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1A-3 are also applicable to FIG. 4, and are incorporated herein by reference. Thus, the above description may not be repeated here.

Referring to FIG. 4, a processor (for example, the processor 200 of FIG. 1A) may reduce a size of slk', and may reduce an operation quantity using the reduced slk'.

Unlike the example of FIG. 3, which uses slk' as RGSW(s), the processor 200 may use RLWE'($s^2$) as slk'. The processor 200 may generate a second encryption key using slk*←RLWE($s^*=\Sigma s_i^*X^i$) and slk'←RLWE'($s^2$).

The processor 200 may generate a blind rotation key using $lk_{i,j}^* \leftarrow slk_{i,j}^* \odot (slk',(1,0)) = RLWE(g_j \cdot s_j^* \cdot s)$. According to a definition of RGSW, RGSW(s) may be represented as RGSW(s)=(RLWE(s·s),RLWE'(s)), and according to a definition of RLWE', RLWE'(s) may be represented as constant term times of RLWE(s) of RLWE'(s). Since (1, 0) corresponds to RLWE(s) according to the definition of RLWE, RLWE(s) may be a simple value that does not have to be pre-encrypted.

Since the processor 200 does not need to generate RLWE'(s) in advance, RGSW(s) may be calculated using only RLWE'($s^2$). Due to a simple structure of RLWE'(s), the processor 200 may rapidly generate a blind rotation key.

In another example, the processor 500 may reduce a number of shift and zeroise operations. Using the example of FIG. 4, the processor 500 may reduce a number of operations from O(N log N) to O(N) using automorphic mapping.

In operation 411, the processor 500 may receive RLWE $(a_0+a_1X+a_2X^2 \ldots +a_{N-1}X^{N-1})$. In operation 413, the processor 500 may convert RLWE using automorphic mapping of RLWE ciphertext. In operation 415, the processor 500 may generate ciphertext of which a sign of an odd-numbered term is reversed, as RLWE$(a_0-a_1X+a_2X^2 \ldots -a_{N-1}X^{N-1})$, using automorphic mapping.

In operation 417, the processor 500 may calculate a sum of RLWE$(a_0+a_1X+a_2X^2 \ldots +a_{N-1}X^{N-1})$ and RLWE$(a_0-a_1X+a_2X^2 \ldots -a_{N-1}X^{N-1})$. In operation 419, the processor 500 may obtain RLWE$(2a_0+2a_2X^2 \ldots +2a_{N-2}X^{N-2})$ from a result of the sum.

In operation 421, the processor 500 may calculate a difference between RLWE$(a_0+a_1X+a_2X^2 \ldots +a_{N-1}X^{N-1})$ and RLWE$(a_0-a_1X+a_2X^2 \ldots -a_{N-1}X^{N-1})$. In operation 423, the processor 500 may obtain RLWE$(2a_1X+2a_3X^3 \ldots +2a_{N-1}X^{N-1})$ from the difference.

The processor 500 may obtain ciphertext that encrypts an even-numbered coefficient using RLWE$(2a_0+2a_2X^2 \ldots +2a_{N-2}X^{N-2})$, and may obtain ciphertext that encrypts an odd-numbered coefficient using RLWE$(2a_1X+2a_3X^3 \ldots +2a_{N-1}X^{N-1})$.

In operation 425, the processor 500 may multiply RLWE$(2a_1X+2a_2X^3 \ldots +2a_{N-1}X^{N-1})$ with $X^{-1}$. In operation 427, the processor 500 may obtain RLWE$(2a_1+2a_3X^2 \ldots +2a_{N-1}X^{N-1})$ from a result of the multiplication.

The processor 500 obtain ciphertext that encrypts all coefficients respectively using N-1 times of operations using automorphic mapping by recursively performing operations 411 to 427.

In another example, in performing a blind rotation operation, the processor 500 may cause that output ciphertext and input ciphertext correspond to different secret keys.

When generating slk* and slk', the processor 200 may generate ciphertext for a new secret key z, not a secret key s used in the input ciphertext. For example, the processor 200 may generate ciphertext as slk*←RLWE$_z$'$(s^*=\Sigma s_i^*X^i)$ and slk'←RLWE$_z$'$(s^2)$. The processor 200 may cause output ciphertext and input ciphertext to have different secret keys.

Figure 5:
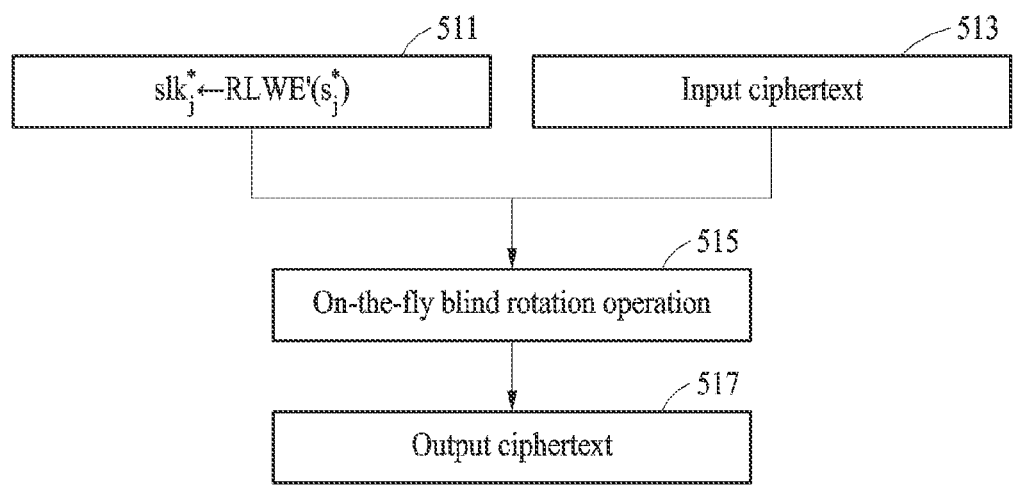
FIG. 5 illustrates an example of an on-the-fly LUT operation.

FIG. 5 illustrates an example of an on-the-fly LUT operation. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1A-4 are also applicable to FIG. 5, and are incorporated herein by reference. Thus, the above description may not be repeated here.

Referring to FIG. 5, a processor (for example, the processor 500 of FIG. 1B) may perform a blind rotation operation on-the-fly.

The processor 500 may receive a first encryption key slk'=RLWE'($s^2$). In operation 511, the processor 500 may receive slk$_j$*←RLWE'($s_j$*). The processor 500 may obtain slk$_j$* by performing operations 311 to 314 of FIG. 3.

In operation 513, the processor 500 may receive a ciphertext input. The processor 500 may receive ciphertext $(\vec{a}, b)$ for u.

The processor 500 may define a function f for an arbitrary function g, on which an operation is desired to be performed, as $f(X) = \Sigma_{k=0}^{N-1} g(k) \cdot X^k$, and may perform initialization.

In operation 515, the processor 500 may perform an on-the-fly blind rotation operation based on $slk_j^*$ and the ciphertext.

The processor 500 may calculate RLWE'$(X^{a_j \cdot s_j})$=RLWE'$(1)+(X^{a_j}-1) \cdot$RLWE'$(s_j^+)+(X^{-a_j}-1) \cdot$RLWE'$(s_j^-)$ using $slk_j^+$=RLWE'$(s_j^+)$ and $slk_j^-$=RLWE'$(s_j^-)$.

The processor 500 may calculate a⊙RLWE'$(X^{a_j \cdot s_j})$=(a',b') for $ACC_j$=(a,b), and may calculate a'⊙RLWE'$(s^2)$+(b',0)=RLWE$(a \cdot s \cdot X^{a_j \cdot s_j})$. In addition, the processor 500 may calculate $ACC_{j+1} \leftarrow$RLWE$(a \cdot s \cdot X^{a_j \cdot s_j})$+b⊙RLWE'$(X^{a_j \cdot s_j})$.

The processor 500 may obtain RLWE ciphertext $ACC_N$ for $m_i = g(u_i) + d_1 \cdot X + \ldots + d_{N-1} \cdot X^{N-1}$ by iteratively performing the above-described calculation process for j={0, ..., N−1}.

In operation 517, the processor 200 may output ciphertext on which the blind rotation operation is performed. The processor 500 may enhance the memory efficiency by performing the blind rotation operation on-the-fly.

Figure 6:
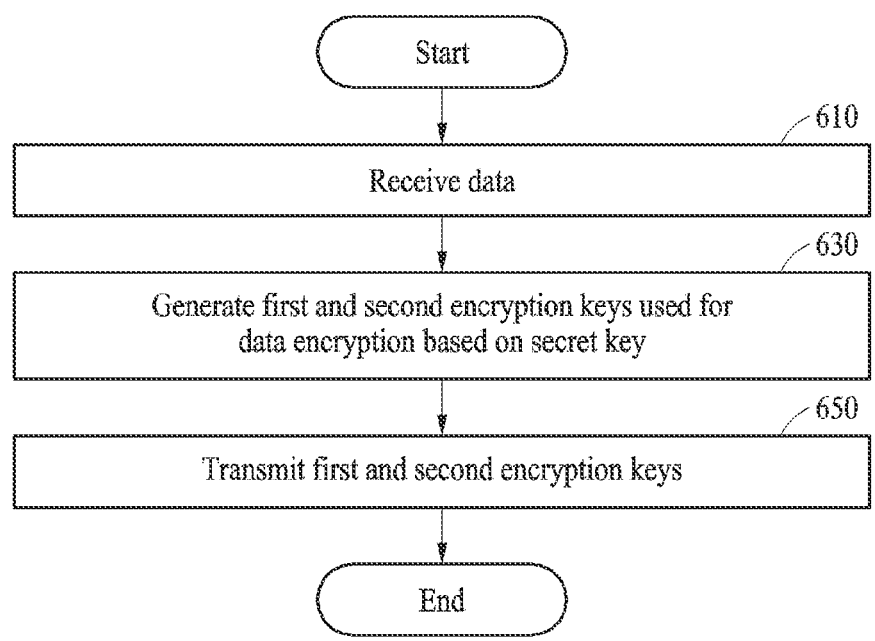
FIG. 6 illustrates an example of an operation of the encryption key generation apparatus of FIG. 1A.

FIG. 6 illustrates an example of an operation of the encryption key generation apparatus of FIG. 1A. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1A-5 are also applicable to FIG. 6, and are incorporated herein by reference. Thus, the above description may not be repeated here.

In operation 610, a receiver (for example, the receiver 100 of FIG. 1A) may receive data.

In operation 630, a processor (for example, the processor 200 of FIG. 1A) may generate a first and second encryption keys based on a secret key. The first encryption key may include RGSW ciphertext or RLWE' ciphertext. The second encryption key may include RLWE ciphertext.

The processor 200 may generate the first encryption key using RGSW ciphertext based on a secret key or using RLWE' ciphertext based on a square of a secret key.

The processor 200 may determine an encryption constant based on a secret key. The processor 200 may generate the second encryption key based on the secret key and the encryption constant.

In operation 650, the processor 200 may transmit the first and second encryption keys.

Figure 7:
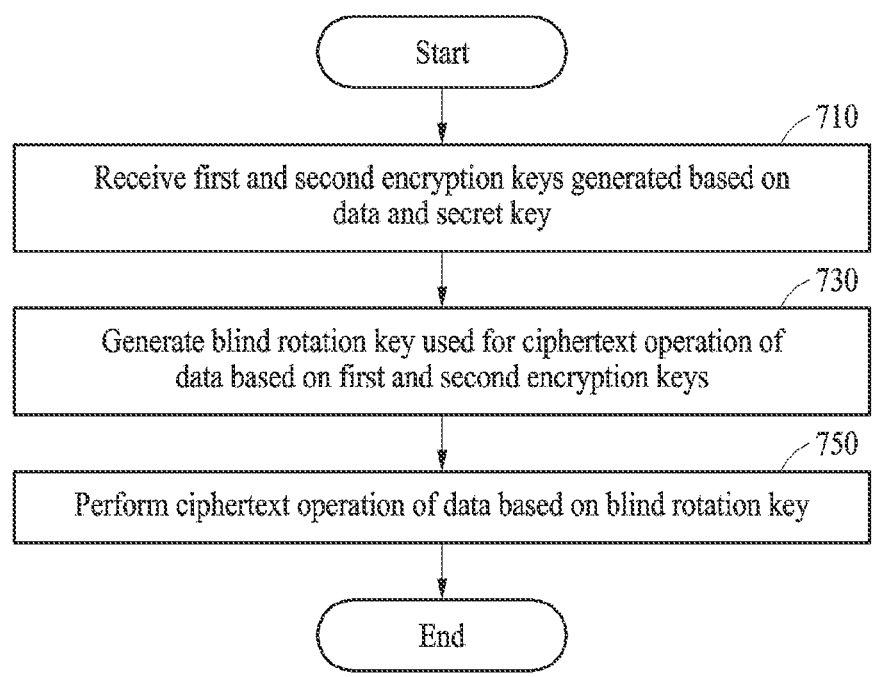
FIG. 7 illustrates an example of an operation of the ciphertext operation apparatus of FIG. 1B.

FIG. 7 illustrates an example of an operation of the ciphertext operation apparatus of FIG. 1B. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 27 below, the descriptions of FIGS. 1A-6 are also applicable to FIG. 7, and are incorporated herein by reference. Thus, the above description may not be repeated here.

Referring to FIG. 7, in operation 710, a receiver (for example, the receiver 400 of FIG. 1B) may receive a first and second encryption keys generated based on data and a secret key.

In operation 730, the processor 500 may generate a blind rotation key used for a ciphertext operation of data based on the first and second encryption keys. The processor 500 may generate a portion of the blind rotation key by performing shift and zeroise operations on the second encryption key.

The processor 500 may generate ciphertext corresponding to the second encryption key. The processor 500 may generate ciphertext of which a sign of a portion of coefficients among coefficients of a polynomial corresponding to the ciphertext is reversed by converting the sign.

The processor 500 may generate a portion of the blind rotation key by adding or subtracting the ciphertext and the ciphertext of which the sign is reversed. The processor 200 may generate a blind rotation key based on a product of the first encryption key and the portion of the blind rotation key.

In operation 750, the processor 500 may perform a ciphertext operation of data based on the blind rotation key.

The encryption key generation apparatus 10, the ciphertext operation apparatus 30, the processor 200, the processor 500, the receiver 100, the receiver 400, and other apparatuses, devices, units, modules, and components described herein with respect to FIGS. 1 and 4 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. In an example, the instructions or software includes at least one of an applet, a dynamic link library (DLL), middleware, firmware, a device driver, an application program storing the method of training a neural network model method of generating an encryption key for performing encryption based on homomorphic encryption. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of generating an encryption key for performing encryption based on homomorphic encryption, the method comprising:
    generating, based on received data and a secret key, a first encryption key and a second encryption key used for encrypting the received data and performing homomorphic operations;

determining an encryption constant based on the secret key; and transmitting the first and second encryption keys, wherein the second encryption key is generated based on the secret key and the encryption constant.

2. The method of claim 1, wherein the first encryption key comprises Ring Gentry Sahai Waters (RGSW) ciphertext or ring learning with error (RLWE) ciphertext, and the second encryption key comprises RLWE ciphertext.

3. The method of claim 1, wherein the generating of the first encryption key and the second encryption key comprises generating the first encryption key using Ring Gentry Sahai Waters (RGSW) ciphertext based on the secret key or using ring learning with error' (RLWE') ciphertext based on a square of the secret key.

4. A processor-implemented ciphertext operation method based on homomorphic encryption, the ciphertext operation method comprising:

generating, based on first and second encryption keys generated based on data and a secret key, a blind rotation key used for a ciphertext operation of the data; and performing the ciphertext operation of the data based on the blind rotation key.

5. The ciphertext operation method of claim 4, wherein the generating of the blind rotation key comprises:

generating a portion of the blind rotation key by performing shift and zeroise operations on the second encryption key; and generating the blind rotation key based on a product of the first encryption key and the portion of the blind rotation key.

6. The ciphertext operation method of claim 5, wherein the generating of the portion of the blind rotation key by performing the shift and zeroise operations on the second encryption key comprises:

generating ciphertext corresponding to the second encryption key;

generating ciphertext having a sign of a portion of coefficients of a polynomial corresponding to the ciphertext being reversed by converting the sign; and generating the portion of the blind rotation key by adding or subtracting the ciphertext and the ciphertext with the sign reversed.

7. The ciphertext operation method of claim 6, wherein the generating of the ciphertext with the sign reversed comprises converting the sign of a term, of which a remainder obtained by dividing an exponent of the coefficients of the polynomial by a degree of the polynomial is a predetermined number.

8. The ciphertext operation method of claim 6, wherein the generating of the portion of the blind rotation key by adding or subtracting the ciphertext and the ciphertext with the sign reversed comprises:

obtaining a portion of coefficients of the polynomial by adding or subtracting the ciphertext and the ciphertext with the sign reversed; and generating the portion of the blind rotation key based on the portion of the coefficients.

9. An encryption key generation apparatus for performing encryption based on homomorphic encryption, the encryption key generation apparatus comprising:

at least one hardware processor configured to generate, based on received data and a secret key, a first encryption key and a second encryption key used for encrypting the received data and performing homomorphic operations;

determining an encryption constant based on the secret key; and transmit the first and second encryption keys, wherein the second encryption key is generated based on the secret key and the encryption constant.

10. The encryption key generation apparatus of claim 9, wherein the first encryption key comprises Ring Gentry Sahai Waters (RGSW) ciphertext or ring learning with error (RLWE) ciphertext, and the second encryption key comprises RLWE ciphertext.

11. The encryption key generation apparatus of claim 9, wherein the at least one hardware processor is further configured to generate the first encryption key using Ring Gentry Sahai Waters (RGSW) ciphertext based on the secret key or using ring learning with error' (RLWE') ciphertext based on a square of the secret key.

12. A ciphertext operation apparatus based on homomorphic encryption, the ciphertext operation apparatus comprising:

at least one hardware processor configured to:

generate, based on first and second encryption keys generated based on received data and a secret key, a blind rotation key used for a ciphertext operation of the data; and perform the ciphertext operation of the data based on the blind rotation key.

13. The ciphertext operation apparatus of claim 12, wherein the at least one hardware processor is further configured to:

generate a portion of the blind rotation key by performing shift and zeroise operations on the second encryption key, and generate the blind rotation key based on a product of the first encryption key and the portion of the blind rotation key.

14. The ciphertext operation apparatus of claim 13, wherein the at least one hardware processor is further configured to:

generate ciphertext corresponding to the second encryption key, generate ciphertext having a sign of coefficients of a polynomial corresponding to the ciphertext being reversed by converting the sign, and generate the portion of the blind rotation key by adding or subtracting the ciphertext and the ciphertext with the sign reversed.

15. The ciphertext operation apparatus of claim 14, wherein the at least one hardware processor is further configured to generate the ciphertext with the sign reversed by converting the sign of a term, of which a remainder obtained by dividing an exponent of the coefficients of the polynomial by a degree of the polynomial is a predetermined number.

16. The ciphertext operation apparatus of claim 14, wherein the at least one hardware processor is further configured to:

obtain a portion of coefficients of the polynomial by adding or subtracting the ciphertext and the ciphertext with the sign reversed, and generate the portion of the blind rotation key based on the portion of the coefficients.

17. A ciphertext operation apparatus based on homomorphic encryption, the ciphertext operation apparatus comprising:

at least one hardware processor configured to:

generate, based on first and second encryption keys generated based on data and a secret key, a portion of a blind rotation key used for a ciphertext operation of the data, where the portion is less than an entirety of the blind rotation key, and perform the ciphertext operation of the data based on the portion of the blind rotation key.

18. The method of claim 1, further comprises a blind operation key generated based on the first and second encryption keys to rotate coefficient of a polynomial corresponding to the ciphertext.

19. The method of claim 4, further comprising performing, based on the blind rotation key, a blind rotation operation by rotating coefficients of a polynomial corresponding to the ciphertext.

* * * * *